(12) United States Patent
Donovan et al.

(10) Patent No.: US 10,988,416 B2
(45) Date of Patent: Apr. 27, 2021

(54) COLLOIDAL VESICLES FOR USE AS DEDUSTING AGENTS IN CONSTRUCTION PANELS

(71) Applicant: UNITED STATES GYPSUM COMPANY, Chicago, IL (US)

(72) Inventors: Alexander J. Donovan, Lake Forest, IL (US); Salvatore C. Immordino, Trevor, WI (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 191 days.

(21) Appl. No.: 16/366,012

(22) Filed: Mar. 27, 2019

(65) Prior Publication Data

US 2019/0322583 A1 Oct. 24, 2019

Related U.S. Application Data

(60) Provisional application No. 62/661,285, filed on Apr. 23, 2018.

(51) Int. Cl.
 *C04B 24/28* (2006.01)
 *C04B 14/10* (2006.01)
 (Continued)

(52) U.S. Cl.
 CPC .......... *C04B 24/285* (2013.01); *C04B 14/10* (2013.01); *C04B 14/18* (2013.01); *C04B 14/28* (2013.01);
 (Continued)

(58) Field of Classification Search
 CPC .............................. C04B 2103/0075
 See application file for complete search history.

(56) References Cited

U.S. PATENT DOCUMENTS 2,064,800 A 12/1936 Kauffmann et al.
5,643,510 A 7/1997 Sucech
(Continued)

FOREIGN PATENT DOCUMENTS

WO WO-2009040359 A1 * 4/2009 ............. C04B 28/02
WO 2017078726 A1 5/2017

OTHER PUBLICATIONS

Biology Dictionary, Vesicle—Definition, Types and Function. Visited Jan. 13, 2021. (Year: 2017).*

*Primary Examiner* — David Sample
(74) *Attorney, Agent, or Firm* — Votys, Sater Seymour and Pease LLP; Pradip Sahu; Philip T. Petti (57) ABSTRACT

Ceiling tiles and wallboards can be produced with vesicle dedusting agent. For example, a ceiling tile can comprise: a dried base mat that includes: (a) mineral wool; (b) binder; (c) a vesicle dedusting agent at about 0.01 to about 10 wt %, wherein the vesicle dedusting agent comprises vesicles; (d) optionally cellulosic fiber; (e) optionally perlite; (f) optionally glass fiber; and (g) optionally calcium sulfate dihydrate. For example, a wallboard produced from a slurry comprising: (a) calcium sulfate hemihydrate at 70 to 95 wt %; (b) a vesicle dedusting agent at about 0.01 to about 10 wt %, wherein the vesicle dedusting agent comprises vesicles; (c) optionally cellulose fibers at about 0.5 to about 3 wt %; (d) optionally at least one dispersant at about 0.01 to about 2 wt %; and (e) water at a ratio of water to dry components of about 1:6 to about 20:1.

14 Claims, 4 Drawing Sheets

(51) Int. Cl.
*C04B 14/18* (2006.01)
*C04B 14/28* (2006.01)
*C04B 14/42* (2006.01)
*C04B 14/46* (2006.01)
*C04B 18/24* (2006.01)
*C04B 24/08* (2006.01)
*C04B 24/24* (2006.01)
*C04B 24/38* (2006.01)
*C04B 28/14* (2006.01)
*E04F 13/16* (2006.01)
*C04B 111/00* (2006.01)
*C04B 103/00* (2006.01)
*C04B 103/44* (2006.01)

(52) U.S. Cl.
CPC ............. *C04B 14/42* (2013.01); *C04B 14/46* (2013.01); *C04B 18/24* (2013.01); *C04B 24/08* (2013.01); *C04B 24/246* (2013.01); *C04B 24/383* (2013.01); *C04B 28/14* (2013.01); *E04F 13/16* (2013.01); *C04B 2103/0075* (2013.01); *C04B 2103/44* (2013.01); *C04B 2111/0062* (2013.01); *C04B 2111/00603* (2013.01)

(56) References Cited

U.S. PATENT DOCUMENTS

| | | |
|---|---|---|
| 5,683,635 A | 11/1997 | Sucech et al. |
| 6,358,309 B1 | 3/2002 | Langford |
| 6,494,609 B1 | 12/2002 | Wittbold et al. |
| 6,733,581 B2 | 5/2004 | Langford |
| 6,863,723 B2 | 3/2005 | Langford |
| 6,874,930 B2 | 4/2005 | Wittbold et al. |
| 7,007,914 B2 | 3/2006 | Petersen et al. |
| 7,045,008 B2 | 5/2006 | Langford |
| 7,048,791 B2 | 5/2006 | Langford |
| 7,052,544 B2 | 5/2006 | Langford |
| 7,166,355 B2 | 1/2007 | Jahns et al. |
| 7,296,919 B2 | 11/2007 | Petersen et al. |
| 7,407,996 B2 | 8/2008 | Langford |
| 7,449,060 B2 | 11/2008 | Langford |
| 7,503,430 B2 | 3/2009 | Englert et al. |
| 8,329,785 B2 | 12/2012 | Langford |
| 8,673,071 B2 | 3/2014 | Immordino, Jr. et al. |
| 9,115,027 B2 | 8/2015 | Ayambem et al. |
| 9,388,079 B2 | 7/2016 | Langford |
| 9,802,866 B2 | 10/2017 | Yu et al. |
| 2007/0246683 A1 | 10/2007 | Miller et al. |
| 2008/0308968 A1 | 12/2008 | Immordino, Jr. |
| 2013/0298991 A1 | 11/2013 | Parker et al. |
| 2015/0291475 A1* | 10/2015 | Pei .................. C04B 28/04 106/656 |
| 2015/0329783 A1* | 11/2015 | Tsai .................. B29C 44/02 264/45.3 |
| 2016/0032583 A1 | 2/2016 | Xu et al. |
| 2016/0123009 A1 | 5/2016 | Ayambem |
| 2016/0168439 A1 | 6/2016 | Ayambem |
| 2017/0081245 A1 | 3/2017 | Margheritis et al. |
| 2017/0204604 A1 | 7/2017 | Frank et al. |
| 2018/0002233 A1 | 1/2018 | Yu et al. |

* cited by examiner

COLLOIDAL VESICLES FOR USE AS DEDUSTING AGENTS IN CONSTRUCTION PANELS

FIELD OF THE INVENTION

This invention relates generally to constructions panels (e.g., ceiling tiles and wallboards) comprising novel vesicle dedusting agents.

BACKGROUND OF THE INVENTION

In the construction of buildings, two of the more common building elements are gypsum wallboard, often known as drywall or gypsum paneling, and ceiling tiles. These building elements may be composed of any of a variety of materials, including but not limited to, cementitious materials (e.g., cement or gypsum) and other silica materials (e.g., perlite). During the instillation of the gypsum wallboard and ceiling tiles, machinery is used to cut and sand the building materials to customized sizes and shapes. When doing so, a significant amount of dust is produced that potentially contains respirable crystalline silica (RCS), which are silica particles less than 10 microns. Evidence presented by the medical community compiled over several decades indicates that RCS is a danger to human health and, accordingly, exposure levels have been regulated.

Liquid mineral oils and solid waxes (for example polyethylene glycol wax) are known to reduce dust in gypsum-based compositions and are often incorporated with the gypsum wallboard and ceiling tile formulation as a dedusting agent. A dedusting agent is defined as a material with the ability to reduce the production of airborne dust generated upon sanding or other disturbance and/or with the ability to reduce the airborne residence time of the dust generated compared to a similar material without the dedusting additive. Examples of mineral oil and solid wax dedusting agents are described in U.S. Pat. No. 7,503,430 of Englert et al. and U.S. Patent Application Publication No. 2008/0308968 of Immordino, Jr.

However, these dedusting agents have a number of drawbacks. For example, liquid mineral oils and waxes are substantially as individually dispersed, free molecules in the construction panels. When drying, thermodynamics and their wetting physical properties causes these molecules to migrate toward the surface of the gypsum product, which results in an uneven distribution of dust reducing properties. Further, when at the surface, mineral oils and liquid waxes also cause the loss of adhesion to the substrate at higher concentrations. Additionally, when some water-soluble, synthetic waxes are added to the slurry water with other solid components, the solid synthetic waxes tend to float on the surface for a long time, dissolving slowly after prolonged mixing.

Alternative dedusting agents that include wax emulsions and polymer coated wax core particulates have been developed, for example, as described in U.S. Pat. No. 7,166,355 of Jahns et al. and U.S. Patent Application Publication No. 2016/0123009 of Ayambem. In this example, the emulsion or polymer coating allow a solid, hydrophobic core material to be dispersed in water.

SUMMARY OF THE INVENTION

This invention relates generally to constructions panels (e.g., ceiling tiles and wallboards) comprising novel vesicle dedusting agents.

In particular the invention provides a ceiling tile comprising:
a dried base mat that comprises:
(a) mineral wool;
(b) binder;
(c) a vesicle dedusting agent at about 0.01 wt % to about 10 wt %, wherein the vesicle dedusting agent comprises vesicles;
(d) optionally cellulosic fiber;
(e) optionally perlite;
(f) optionally glass fiber; and
(g) optionally calcium sulfate dihydrate.

In particular the invention also provides a wallboard produced from a slurry, the slurry comprising:
(a) calcium sulfate hemihydrate at 70 wt % to 95 wt %;
(b) a vesicle dedusting agent at about 0.01 wt % to about 10 wt %, wherein the vesicle dedusting agent comprises vesicles;
(c) optionally cellulose fibers at about 0.5 wt % to about 3 wt %;
(d) optionally at least one dispersant at about 0.01 wt % to about 2 wt %; and
(e) water at a ratio of water to dry components of about 1:6 to about 20:1.

Other advantages, benefits and aspects of the invention are discussed below, are illustrated in the accompanying figures, and will be understood by those of skill in the art from the more detailed disclosure below. All percentages, ratios and proportions herein are by weight, unless otherwise specified.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

DETAILED DESCRIPTION OF THE INVENTION

All percentages and ratios used herein, unless otherwise specified, are by weight (i.e., wt. %) unless otherwise indicated.

This invention relates generally to constructions panels (e.g., ceiling tiles and wallboards) comprising novel vesicle dedusting agents. The vesicles may be liposomes or polymersomes, which are supramolecular structures formed by assembling lipids and/or polymers into the bilayer walls of the vesicle.

Vesicles comprise fluid in a cavity formed by the lipid bilayer.

Figure 1:
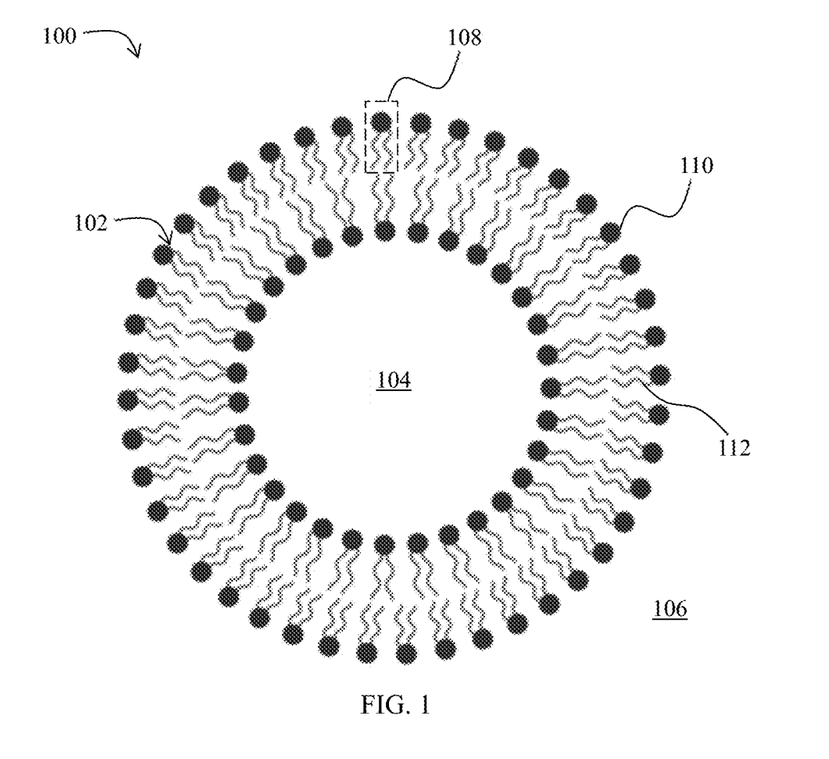
FIG. 1 illustrates a representation of a unilamellar vesicle.

FIG. 1 illustrates a representation a unilamellar vesicle 100 (i.e., a vesicle having one wall 102) with an aqueous fluid 104 inside the vesicle 100 and an aqueous fluid 106 outside the vesicle 100. The wall 102 comprises amphiphilic compounds 108 having a hydrophilic head group 110 and a hydrophobic tail group 112. The vesicles in the vesicle dedusting agent described herein preferably comprise unilamellar vesicles with an average hydrodynamic diameter of about 50 nm to about 500 nm and/or multilamellar vesicles with an average hydrodynamic diameter of about 100 nm to about 25 microns.

In contrast, other construction panel, including those described above, use dedusting agents like amphiphilic compounds in their free form.

Figure 2:
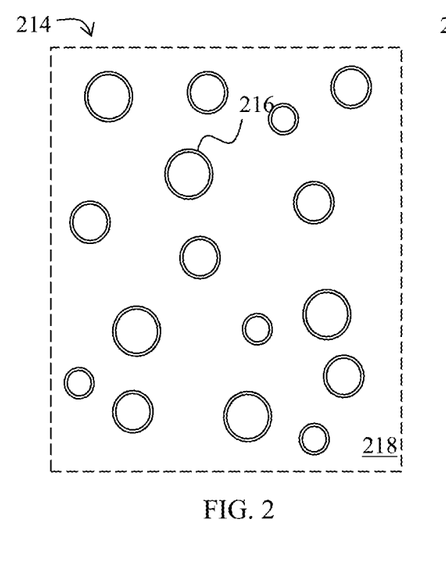
FIG. 2 illustrates a representation of an aqueous slurry that has dispersed therein the vesicle dedusting agent that comprises vesicles, which can be used for making a construction panel of the present invention.

FIG. 2 illustrates a representation of an aqueous slurry 218 that has dispersed therein the vesicle dedusting agent that comprises vesicles 216, which can be used for making a construction panel of the present invention.

Figure 3:
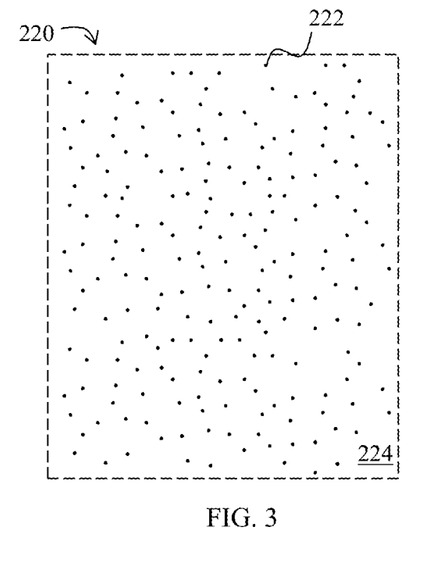
FIG. 3 illustrates a representation of an aqueous slurry that has dispersed therein a dedusting agent that comprises free polymers, which can be used for making a traditional construction panel.

FIG. 3, in contrast, illustrates a representation of an aqueous slurry 224 that has dispersed therein a dedusting agent that comprises free polymers 222, which can be used for making a traditional construction panel.

FIGS. 2 and 3 are to similar scales and represent the different construction panels before drying and/or setting.

In the free form, compounds like lecithin migrate to the surface of the slurry during drying because of the compound's amphiphilic properties. Therefore, the bulk of the dedusting agent based on free form slurry dispersions is at or near the surface of the dried and/or set construction panel, which results in higher dusting as the construction panel is cut and sanded.

Vesicles, on the other hand, form a bilayer structure with hydrophilic head groups on the vesicle exterior. Therefore, the thermodynamic driving force for surface migration is greatly reduced with vesicles compared to free compounds. As such, the vesicles will be more homogeneously dispersed through the dried and/or set construction panel, which results in more effective dedusting as the construction panel is cut and sanded.

In either instance (free or vesicle), the main driver for the dedusting effect is the phase change of the compounds like lecithin from fluid to solid. Sanding induces the phase change to the fluid state so the compounds agglomerate the dust particulates. Therefore, it is believed that the vesicle structure will minimally to not affect the overall dedusting efficacy of the amphiphilic compound (e.g., lecithin).

Finally, regarding known wax emulsions and polymer coated wax core particulates, these dedusting agents are hydrophobic particulates with a coating (polymer or emulsifier) that allows for better dispersion in water. In contrast, the vesicles in the vesicle dedusting agents of the present invention have an aqueous core (see FIG. 1) and the molecules and compounds that compose the wall of the vesicle provide reduce dusting.

Vesicle Dedusting Agent

The vesicle dedusting agents used in the present invention comprises vesicles. The vesicles may be liposomes or polymersomes. A liposome is a supramolecular assembly of lipid molecules that has a lipid bilayer structure that encapsulates fluid as illustrated below. Lipid vesicles or liposomes consist of amphiphilic molecules called phospholipids with a hydrophilic, polar head group and hydrophobic, hydrocarbon tails.

In aqueous solution, phospholipids (e.g. phosphatidylcholine (PC) and phosphatidylethanolamine) organize into vesicles with a bilayer shell. A polymersome similarly is a supramolecular assembly of polymer that has a polymer shell that encloses a solution. Polymeric vesicles, or polymersomes, are colloidal capsules with an aqueous core surrounded by a polymeric shell. Amphiphilic block copolymers, such as those composed of a hydrophilic block (e.g., poly(ethylene oxide) (PEO)) and a hydrophobic block (e.g. poly($\varepsilon$-caprolactone) (PCL) or polylactide (PLA)), spontaneously self-assemble into colloidal structures in aqueous solution. For the present vesicles the outer and inner fluids are aqueous.

In preparing the a construction panel, the vesicles are first synthesized by known methods including film rehydration, extrusion, solvent displacement, ultrasonication, high pressure homogenization, high shear mixing, supercritical fluid processing, and detergent dialysis. A preferred method, for example, includes dispersing lecithin in an organic solvent, then evaporating the organic solvent to leave the lipid bilayers. The lipid bilayers are then rehydrated in water and formed into vesicles via ultrasonication, membrane extrusion, and/or homogenization.

After forming vesicles, the material can be dried to a powder (e.g., via lyophilization or spray drying) and mixed either with the dry components of the construction panel or a corresponding slurry. Alternatively, the vesicle dedusting agent dispersed in an aqueous solvent (either after formation or redispersed after drying) can be added to a construction panel slurry. When using a vesicle dedusting agent in aqueous dispersion, the storage and handling conditions of the vesicle dedusting agent should be maintained to mitigate degradation or spoilage of a phospholipid and/or polymer component of the vesicles. Degradation or spoilage can be caused by temperature, humidity, bacteria, and mold.

Vesicles may have one bilayer wall (unilamellar) (e.g., as illustrated in FIG. 1) or may have multiple, concentric bilayer walls (multilamellar). A mixture of unilamellar and multilamellar vesicles is also suitable for use in the vesicle dedusting agents of the present invention.

The average hydrodynamic diameter (or mean hydrodynamic diameter) of unilamellar vesicles can be about 50 nm up to 5000 nm, preferably about 50 nm up to 1000 nm, more preferably about 50 nm up to 500 nm, and most preferably about 100 nm to about 300 nm. Preferably, the unilamellar vesicles also have a low polydispersity index (PDI). While the PDI of the vesicles may be about 0.2 to about 0.7, it is preferable to have a PDI of about 0.2 to about 0.5, and more preferably about 0.2 to about 0.4.

The average hydrodynamic diameter of multilamellar vesicles can be about 100 nm up to 25 microns, and preferably about 100 nm to about 5 microns, and more preferably about 100 nm to about 1 micron. Preferably, the multilamellar vesicles also have a low polydispersity index (PDI). While the PDI of the vesicles may be about 0.2 to about 0.7, it is preferable to have a PDI of about 0.2 to about 0.5, and more preferably about 0.2 to about 0.4.

Average hydrodynamic diameter and PDI for unilamellar and multilamellar vesicle can be determined from a particle size distribution plot obtained via dynamic light scattering (DLS). DLS is a method to characterize the size and concentration of colloidal dispersions. The Stokes-Einstein Equation relates the hydrodynamic radius of a colloidal particle (assuming a hard sphere) with its diffusivity in a given solvent with known viscosity. In DLS a coherent laser light source is directed perpendicular to the sample. The light scattering of colloidal particles is detected by an autocorrelator computer to construct a correlation function, from which a correlation coefficient is extracted. From this autocorrelation function, the diffusivity, and hence the hydrodynamic radius, of colloidal particles can be measured.

The light scattering from DLS is not weight- or number-based. It is proportional to the sixth power of the radius. In other words, particles that are ten times bigger will scatter one million times more light. In peer-reviewed publications, average hydrodynamic diameter extracted from raw DLS data is reflective of this, unless otherwise noted as volume ($10^3$), surface area ($10^2$), or number ($10^1$).

Compounds suitable for forming vesicles (described below) have been used as dedusting agents in a free form (i.e., predominantly individual solubilized compounds).

The bilayers of the liposome vesicles in the dedusting agent can comprise phospholipids (natural or synthetic), functionalized phospholipids, or mixtures thereof. Exemplary phospholipids include: lecithin (phosphatidylcholine), phosphatidylserine, phosphatidylinositol, phosphatidylethanolamine (PE), and mixtures thereof. Functionalized phospholipids include the foregoing phospholipids conjugated with polyethylene glycol (PEG) or polyethylene oxide (PEO), fluorescent or chromogenic dyes, proteins, peptides, carbohydrates (e.g., cellulose, starch, modified cellulose, modified starch), or synthetic polymers. Where a PEG or PEO phospholipid derivative is utilized, the weight percentage on a dry basis of the PEG or PEO is about 0.1 mol % to 10 mol % relative to the total vesicle composition. Preferably, the invention incorporates a PEGylated phospholipid (e.g., natural phospholipids (e.g. soy or egg yolk lecithin) and/or synthetic phospholipids) and/or methoxy-poly(ethylene glycol)-phosphatidylethanolamine (mPEG-PE) into a construction panel formulation to provide the necessary dedusting effect. A dedusting effect is the reduction in the generation of fine airborne dust produced upon sanding or other disturbance compared to disturbing a similar material without the dedusting additive. More preferably, the invention includes a polymeric vesicle (e.g., PEO-b-PCL (Poly(ethylene oxide)-b-poly(ε-caprolactone)) or PEO-b-PLA (Poly(ethylene oxide-b-lactide)) incorporated into the construction panel formulation.

Alternatively, the construction panel formulation incorporates other vesicles which may not contain lecithin, PEG, PEO, or their derivatives. In this case, the dedusting effect is derived from the physical properties of the described vesicles without lecithin, PEO, PEG, or their derivatives dispersed in the construction panel product. It is conceivable that any vesicle containing a material with a melting temperature near room temperature will exhibit a phase change capable of acting as an agglomerating agent.

The polymer shell of polymersomes can comprise amphiphilic polymers, proteins, carbohydrates, lipids, and dendrimers. Amphiphilic polymers include diblock and triblock polymers comprising at least one hydrophilic block and at least one hydrophobic block. Exemplary hydrophilic blocks include: PEG, PEO, and PE. Typically, the PEG or PEO is less than 5000 Daltons. Exemplary hydrophobic blocks include PCL or PLA. Specific block copolymers include: PEO-b-PCL, PEO-b-PLA, and PEG-PE.

In some instances, the vesicles may include both lipids suitable for forming liposomes and block copolymers suitable for forming polymersomes. For example, in such vesicles the amount of block copolymer is typically 0 to about 70 mol % and the amount of lipid is about 30 to 100 mol %. For example, the amount of block copolymer in the vesicle wherein one block is PEG and the other block is a natural phospholipid, is typically 0 to about 20 mol % and the amount of lipid is about 80 to 100 mol %. For example, if mPEG-PE is included, the concentration of mPEG-PE typically ranges from 0-20 mol % in the phospholipid vesicles and the amount of lipid is about 80 to 100 mol %. Preferably, if mPEG-PE is included, the concentration of mPEG-PE ranges from 3-10 mol % in the phospholipid vesicles and the amount of lipid is about 90 to 97 mol %.

Construction Panels—Ceiling Tiles

The present invention is directed, at least in part, to ceiling tiles with less dusting properties and that comprise a vesicle dedusting agent.

A variety of ceiling tile formulations have been sold commercially, as well as described in printed publications and patents. The inventive vesicle dedusting agents can minimize the dust and, consequently, the respirable crystalline silica (RCS) produced from sanding or cutting ceiling tiles. Typically, RCS is produced from the perlite and gypsum components in ceiling tiles. Tables 1, 2, and 3 summarize three preferred inventive ceiling tile formulations. If desired, other additives can be added to any of these formulations. In TABLE 1 a range for a parameter in any column may be combined with the ranges for the other parameters from any other column in TABLE 1. However, preferably in TABLE 1 all the ranges in a column are used together. In TABLE 2 a range for a parameter in any column may be combined with the ranges for the other parameters from any other column in TABLE 2. However, in TABLE 2 preferably all the ranges in a column are used together. In TABLE 3 a range for a parameter in any column may be combined with the ranges for the other parameters from any other column in TABLE 3. However, in TABLE 3 preferably all the ranges in a column are used together.

TABLE 1

Ceiling Tile Formulation 1 (Perlite-Based Ceiling Tile)
(all ranges are wt % of the dried base mat on a dry (water free) basis)

| Component | Useable Range | Preferred Range | Most Preferred Range | Specific Example |
|---|---|---|---|---|
| Mineral Wool | 8 to 25 | 8 to 20 | 15 to 20 | 18 |
| Binder | 9 to 15 | 9.5 to 13 | 9.5 to 10.5 | 9.5 |
| Cellulosic Fiber | 9 to 15 | 10 to 14.5 | 12 to 14 | 12 |
| Perlite | 40 to 65 | 45 to 65 | 55 to 65 | 60 |
| Vesicle dedusting agent | 0.01 to 10 | 0.1 to 5 | 0.1 to 3 | 0.3 to 0.8* |

*ultra-sonicated lecithin vesicles

TABLE 2

Ceiling Tile Formulation 2 (Mineral Wool/Perlite-Based Ceiling Tile)
(all ranges are wt % of the dried base mat on a dry (water free) basis)

| Component | Useable Range | Preferred Range | Most Preferred Range | Specific Example |
|---|---|---|---|---|
| Mineral Wool | 30 to 70 | 40 to 60 | 45 to 50 | 48 |
| Binder | 5 to 15 | 5 to 10 | 6.5 to 8.5 | 7.5 |
| Cellulosic Fiber | 2 to 20 | 8 to 15 | 11 to 13 | 12 |
| Perlite | 10 to 50 | 20 to 40 | 30 to 35 | 32 |
| Vesicle dedusting agent | 0.01 to 10 | 0.1 to 5 | 0.1 to 3 | 0.3 to 0.8* |

*ultra-sonicated lecithin vesicles

TABLE 3

Ceiling Tile Formulation 3 (Mineral Wool-Based Ceiling Tile)
(all ranges are wt % of the dried base mat on a dry (water free) basis)

| Component | Useable Range | Preferred Range | Most Preferred Range | Specific Example |
|---|---|---|---|---|
| Mineral Wool | 60 to 90 | 70 to 85 | 75 to 80 | 90 |
| Glass Fiber | 0 to 10 | 0 to 5 | 0 to 3 | 1.5 |
| Binder | 4 to 10 | 5 to 8 | 5 to 7 | 6 |
| Gypsum (calcium sulfate dihydrate) | 0 to 5 | 0.5 to 3 | 0.5 to 2 | 1 |
| Perlite | 0 to 10 | 0.5 to 6 | 0.5 to 2 | 1 |
| Vesicle dedusting agent | 0.01 to 10 | 0.1 to 5 | 0.1 to 3 | 0.3 to 0.8* |

*ultra-sonicated lecithin vesicles

The ceiling tiles are made by mixing water and these above ingredients to form an aqueous slurry which is then leveled, dried, and cut to form the tiled. The aqueous slurry for forming any of the foregoing ceiling tile formulations may include water in at a weight ratio of water to dry components of about 1:50 to about 1:1, preferably about 1:25 to about 1:3, and more preferably about 1:10 to about 1:5.

Producing Ceiling Tiles

Figure 4:
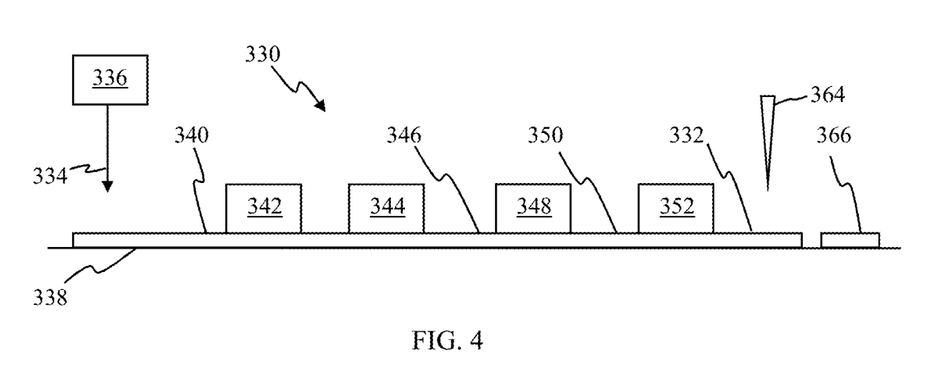
FIG. 4 schematically shows an exemplary method of making the ceiling tile of the present invention.

FIG. 4 schematically shows a water felting line 330 to make the dried base mat 332 and ceiling tile of the present invention. As shown in FIG. 4, in the process, the aqueous slurry 334 of the composition is flowed from an agitated holding tank 336 (also referred to in the art as a headbox) onto a moving foraminous support wire 338 where it forms a filter cake 340 that is dewatered, first by gravity in gravity dewatering unit 342 and then by vacuum in vacuum dewatering unit 344. The speed of the moving foraminous support wire 346 and amount of aqueous slurry 334 flowed from an agitated holding tank 336 should be adjusted to achieve a desired final density. The foregoing parameters may vary by machine as would be apparent to one skilled in the art.

The dewatered cake 346 is then pressed in a pressing unit 348 (e.g., a pressing roll) to reduce the thickness of the dewatered cake 346 about 10% to about 50%, or preferably 10% to 25%, to a thickness of about ½ inch to about 1 inch to form the base mat 350. The pressing step further dewaters the base mat 350. The base mat 350 is then passed into a drying kiln 352 in which the moisture in the base mat is reduced to less than 5 wt %, preferably less than 2 wt %, and more preferably less than 1 wt %, which produces a dried base mat 332.

Optionally, the base mat 350 may be further dewatered with a vacuum dewatering unit (not shown) before introduction to the dryer 352. The dried base mat 332 is then cut by a blade 354 to form cut dried base mats 356 for ceiling tiles.

The dried base mats 356 can have a density of about 10 pounds per cubic foot (pcf) to about 16 pcf, preferably 11 pcf to 14 pcf, and more preferably 12 pcf to about 13 pcf.

Optionally, a coating or laminate can be applied to a face of the dried base mat 356. The coating or laminate can add additional strength and water resistance to the ceiling tile. One example of a laminate includes a glass mat laminate (also referred to as a glass scrim), which may be formed of uncoated fiberglass, polyvinyl chloride (PVC) coated fiberglass, epoxy coated fiberglass, or plastisol resin coated fiberglass.

Mineral Wool

The disclosed compositions contain mineral wool of the type conventionally used in ceiling tiles. Mineral wool in a ceiling tile increases the sound absorption of the ceiling tile. In general, the higher the amount of mineral wool the better the sound absorption. Mineral wool also advantageously gives bulking to the slurry during formation of the core. Mineral wool, also known as mineral fiber, mineral cotton, mineral fiber, man-made mineral fiber (MMMF), and man-made vitreous fiber (MMVF), is a general name for fiber materials that are formed by spinning or drawing molten minerals (or "synthetic minerals" such as slag and ceramics). The mineral wool may be any of the conventional mineral fibers prepared by attenuating a molten stream of basalt, granite, or other vitreous mineral constituent. The molten mineral is either drawn linearly through orifices, commonly referred to as textile fiber, or it is recovered tangentially off the face of a spinning cup or rotor, commonly referred to as wool fiber. Preferably the mineral wool is slag wool or basalt wool. Slag wool is a mineral wool made usually from molten blast-furnace slag by the action of jets of steam under high pressure. Basalt fiber is a material made from extremely fine fibers of basalt, which is composed of the minerals plagioclase, pyroxene, and olivine.

Typically, basalt wool fibers have a diameter of about 5 microns to about 10 microns. Further, commercially available basalt wool fibers include as much as 40% (e.g., about 20% to about 40%) unfiberized material, which is referred to in the art as shot. Typically, slag wool fibers have a diameter of about 2 microns to about 5 microns. Further, commercially available slag wool fibers can include above about 50% (e.g., about 30% to about 60%) shot. The mineral wool used in the inventive compositions and methods described herein may include shot at high concentrations that are typically commercially available or may have a reduced shot concentration achieved, for example, by passing the mineral wool through an air classifier.

On a dry basis for the perlite-based ceiling tile, the mineral wool constituent is present in an amount ranging from about 8 wt % to about 25 wt % on a dry basis of the dried base mat, more preferably about 8 wt % to about 20 wt %, most preferably about 15 wt % to about 20 wt % in the products and processes of the present invention. Glass fibers are not mineral wool.

On a dry basis for the mineral wool/perlite-based ceiling tile, the mineral wool constituent is present in an amount ranging from about 30 wt % to about 70 wt % on a dry basis of the dried base mat, more preferably about 40 wt % to about 60 wt %, most preferably about 45 wt % to about 50 wt % in the products and processes of the present invention. Glass fibers are not mineral wool.

On a dry basis for the mineral wool-base ceiling tile, the mineral wool constituent is present in an amount ranging from about 60 wt % to about 90 wt % on a dry basis of the dried base mat, more preferably about 70 wt % to about 85 wt %, most preferably about 75 wt % to about 80 wt % in the products and processes of the present invention. Glass fibers are not mineral wool.

Binder

The binders suitable for use in the ceiling tile tiles of the present invention include latex binders, starch binders, and a mixture of latex and starch binders. In some instance, starch binders are preferred.

Starch may or may not be cooked prior to use. A starch gel may be prepared by dispersing starch particles in water and heating the slurry until the starch is fully or partially cooked and the slurry thickens to a viscous gel. However, if conventional hydropulped fibers are used as a supplemental source of fiber, they may be incorporated into the starch slurry prior to cooking. The cooking temperature of the starch slurry should be closely monitored to assure the desired degree of swelling of the starch granules. The cooking temperature for cornstarch can range from about 160° F. (71° C.) to about 195° F. (90° C.). Starch may also be used as a binder without pre-cooking the starch, because it forms a gel during the process of drying the base mat. Cornstarch is the preferred binder.

The latex may include acrylic binder, a polyester binder, an acrylo-polyester binder, and mixtures thereof.

Increased binder content, in the form of starch, can be used to increase strength (MOR-modulus of rupture (psi)) and hardness and enhance the cutability of the finished ceiling tile.

On a dry basis for the perlite-based ceiling tile, the binder is present from 9 wt % to about 15 wt % of the dried base mat, preferably from about 9.5 wt % to about 13 wt %, more preferably from about 9.5 wt % to about 10.5 wt % in the products and processes of the present invention.

On a dry basis for the mineral wool/perlite-based ceiling tile, the binder is present from 5 wt % to about 15 wt % of the dried base mat, preferably from about 5 wt % to about 10 wt %, more preferably from about 6.5 wt % to about 8.5 wt % in the products and processes of the present invention.

On a dry basis for the mineral wool-base ceiling tile, the binder is present from 4 wt % to about 10 wt % of the ceiling tile, preferably from about 5 wt % to about 8 wt %, more preferably from about 5 wt % to about 7 wt % in the products and processes of the present invention.

Perlite

An ingredient of the disclosed compositions is a perlite. Expanded perlite is preferred for its low cost and performance. The expanded perlite provides porosity and "loft" in the final product, which enhances acoustical properties.

Perlite is a form of glassy rock, similar to obsidian with the capacity to expand greatly on heating. Perlite generally contains 65 wt % to 75 wt % $SiO_2$, 10 wt % to 20 wt % $Al_2O_3$, 2 wt % to 5 wt % $H_2O$, and smaller amounts of sodium, potassium, iron and calcium oxides. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. (955° C.). The finely ground perlite is carried by the heated air which heats the perlite and causes it to pop like popcorn to form the expanded perlite having a density of about 3 to 10 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e., a perlite which has been expanded to a density of over 7 or 8 pcf (versus the normal range of 3 to 5 pcf), lowers the water needed to form a suitable slurry. See, U.S. Pat. No. 5,911,818 to Baig. The aqueous slurry with less water requires less dewatering, and produces a base mat having less water retained by the perlite. The resulting product has improved compressive resistance and maintained fire ratings, as defined by ASTM E119-16a. The base mat having a lower water content can be dried faster which allows the entire water felting line to be run at higher speed.

High density perlite is also beneficial when manufacturing fire rated ceiling tiles that must meet a minimum density. However, when the density of the expanded perlite exceeds about 20 pdf, the perlite does not produce as much "loft" or bulk in the final product. As a result, the density of the final product may be too high to maintain the low thermal conductivity required to pass the ASTM E119 fire endurance test.

On a dry basis for the perlite-based ceiling tile, the perlite, of either the high or low density type, is present from about 40 wt % to about 65 wt % of the dried base mat, preferably about 45 wt % to about 65 wt %, more preferably about 55 wt % to about 65 wt % in the products and processes of the present invention.

On a dry basis for the mineral wool/perlite-based ceiling tile, the perlite, of either the high or low density type, is present from about 10 wt % to about 50 wt % of the dried base mat, preferably about 20 wt % to about 40 wt %, more preferably about 30 wt % to about 35 wt % in the products and processes of the present invention.

On a dry basis for the mineral wool-base ceiling tile, the perlite, of either the high or low density type, is present from 0 wt % to about 10 wt % of the dried base mat, preferably about 0.5 wt % to about 6 wt %, more preferably about 0.5 wt % to about 2 wt % in the products and processes of the present invention.

Gypsum

Gypsum is a commonly used low cost inorganic material in ceiling tiles and related base mat and slurry compositions. The gypsum is calcium sulfate dihydrate, $CaSO_4.2H_2O$. Gypsum has limited solubility in water and acts as a flocculent. By functioning as a flocculent in the slurry, the gypsum helps to retain and uniformly distribute the fine particles (inorganic clay, organic starch, short cellulosic fibers, etc.) in the mat during the processing (dewatering, vacuum and wet pressing).

In some instances, the perlite-based ceiling tiles and the mineral wool/perlite-based ceiling tiles of the invention, as well as the corresponding dried base mat and the slurry in the process for making the perlite-based ceiling tiles and the mineral wool/perlite-based ceiling tiles of the invention, preferably has an absence of gypsum unless included in a coating or laminate.

Gypsum may optionally be included in the mineral wool-base ceiling tile of the present in. When included, gypsum is present, on a dry basis in the mineral wool-base ceiling tile, from 0.1 wt % to about 5 wt % of the dried base mat, preferably about 0.5 wt % to about 3 wt %, more preferably about 0.5 wt % to about 2 wt % in the products and processes of the present invention. If desired, the mineral wool-base ceiling tiles of the invention, as well as the corresponding dried base mat and the slurry in the process for making the mineral wool-base ceiling tile of the invention can have an absence of gypsum.

Cellulosic Fiber

Cellulosic fibers can serves to provide both wet strength (i.e., the strength of the wet mat prior to drying) and dry strength. The cellulosic fibers may also function as a binder and may help to retain fines.

Preferably the cellulosic fiber is newsprint (also known as ("news"), e.g., hydro-pulped newsprint. Refined paper fibers and wood fiber may also be used as the source of the cellulosic fiber. Cellulosic fibers can be obtained from the bark, wood or leaves of plants, or from a plant-based material. Besides cellulose, these fibers are compound of hemicellulose and lignin, and different percentages of these components are responsible for different mechanical properties observed.

Cellulosic fibers can be included in the perlite-based ceiling tile of the present in. On a dry basis for the perlite-based cover board, cellulosic fibers are present from about 9 wt % to about 15 wt % of the ceiling tile, preferably about 10 wt % to about 14.5 wt %, more preferably about 12 wt % to about 14 wt % in the products and processes of the present invention.

Cellulosic fibers can be included in the mineral wool/perlite-based ceiling tile of the present in. On a dry basis for the mineral wool/perlite-based cover board, cellulosic fibers are present from about 2 wt % to about 20 wt % of the dried base mat, preferably about 8 wt % to about 15 wt %, more preferably about 11 wt % to about 13 wt % in the products and processes of the present invention.

The mineral wool-base ceiling tiles of the invention, as well as the corresponding dried base mat and the slurry in the process for making the mineral wool-base level ceiling tiles of the invention, preferably has an absence of cellulosic fibers.

Additives

In some instances, the perlite-based ceiling tile and the mineral wool/perlite-based ceiling tile of the invention, as well as the corresponding dried base mat and the slurry in the process for making said ceiling tiles of the invention, preferably has an absence of glass fibers unless included in a coating or laminate.

Glass fibers may optionally be included in the mineral wool-base ceiling tile of the present in. When included, glass fibers are present, on a dry basis in the mineral wool-base ceiling tile, from about 0.1 wt % to about 10 wt % of the dried base mat, preferably about 0.5 wt % to about 5 wt %, more preferably about 0.5 wt % to about 3 wt % in the products and processes of the present invention. If desired, the mineral wool-base ceiling tiles of the invention, as well as the corresponding dried base mat and the slurry in the process for making the mineral wool-base ceiling tile of the invention can have an absence of glass fibers unless included in a coating or laminate.

The ceiling tiles of the invention, as well as the corresponding dried base mat and the slurry in the process for making the ceiling tiles of the invention, preferably has an absence of wax emulsions unless included in a coating or laminate.

The ceiling tiles of the invention, as well as the corresponding dried base mat and the slurry in the process for making the ceiling tiles of the invention, preferably has an absence of siloxanes unless included in a coating or laminate.

The ceiling tiles of the invention, as well as the corresponding dried base mat and the slurry in the process for making the ceiling tiles of the invention, preferably has an absence of polymer fibers unless included in a coating or laminate.

The ceiling tiles of the invention, as well as the corresponding dried base mat and the slurry in the process for making the ceiling tiles of the invention, preferably has an absence of glass beads unless included in a coating or laminate.

The ceiling tiles of the invention, as well as the corresponding dried base mat and the slurry in the process for making the ceiling tiles of the invention, preferably has an absence of clay unless included in a coating or laminate.

The ceiling tiles of the invention, as well as the corresponding dried base mat and the slurry in the process for making the ceiling tiles of the invention, preferably has an absence of vermiculite unless included in a coating or laminate.

The ceiling tiles of the invention, as well as the corresponding dried base mat and the slurry in the process for making the ceiling tiles of the invention, preferably has an absence of calcium carbonate unless included in a coating or laminate.

The ceiling tiles of the invention, as well as the corresponding dried base mat and the slurry in the process for making the ceiling tiles of the invention, preferably has an absence of magnesium carbonate unless included in a coating or laminate.

The ceiling tiles of the invention, as well as the corresponding dried base mat and the slurry in the process for making the ceiling tiles of the invention, preferably has an absence of zinc pyrithione unless included in a coating or laminate.

Preferably the perlite-based ceiling tiles and the mineral/wool-based ceiling tiles of the invention, as well as the corresponding dried base mat and the slurry in the process for making said ceiling tiles of the invention, has an absence of all the following ingredients: glass fibers, gypsum, wax emulsions, siloxanes, glass beads, polymer fibers, clay, vermiculite, calcium carbonate, magnesium carbonate, and zinc pyrithione unless included in a coating or laminate.

Preferably the mineral wool-base ceiling tiles of the invention, as well as the corresponding dried base mat and the slurry in the process for making the mineral wool-base ceiling tiles of the invention, has an absence of all the following ingredients: cellulosic fibers, wax emulsions, siloxanes, glass beads, polymer fibers, clay, vermiculite, calcium carbonate, magnesium carbonate, and zinc pyrithione unless included in a coating or laminate. Preferably, the mineral wool-base ceiling tiles can be further absent one or more of: glass fibers, gypsum, and perlite.

The foregoing additive exclusions are on a water free basis so it does not exclude water.

Construction Panels—Gypsum Wallboards

The present invention is directed, at least in part, to gypsum wallboards with less dusting properties and that comprise a vesicle dedusting agent.

An array of ceiling tile formulations have been sold commercially, as well as described in printed publications and patents. The inventive vesicle dedusting agents can minimize the dust and, consequently, the RCS produced from sanding or cutting wallboards. Typically, RCS is produced from the gypsum component in wallboards. Two exemplary inventive wallboard formulations are summarized in TABLES 4 and 5. In some instances, other additives can be added to any of these formulations which are used to make gypsum wallboard. In TABLE 4 a range for a parameter in any column may be combined with the ranges for the other parameters from any other column in TABLE 4. However, preferably in TABLE 4 all the ranges in a column are used together. In TABLE 5 a range for a parameter in any column may be combined with the ranges for the other parameters from any other column in TABLE 5. However, preferably in TABLE 5 all the ranges in a column are used together.

TABLE 4

Wallboard Formulation 1
(For making a wallboard comprising gypsum with embedded cellulose fiber)

| Core layer slurry | Useable Range | Preferred Range | Most Preferred Range | Specific Example |
|---|---|---|---|---|
| Calcium sulfate hemihydrate (wt % on a dry basis) | 70 to 95 | 80 to 90 | 80 to 90 | 80 to 90 |
| Cellulose fibers (wt % on a dry basis) | 4 to 29 | 9 to 19 | 9 to 19 | 9.2 to 19.7 |
| Vesicle dedusting agent (wt % on a dry basis) | 0.01 to 10 | 0.1 to 5 | 0.1 to 3 | 0.3 to 0.8* |
| Weight ratio of the water to calcium sulfate hemihydrate in slurry | 3:1 to 20:1 | 3:1 to 20:1 | 10:1 to 20:1 | 10:1 to 20:1 |

*ultra-sonicated lecithin vesicles

TABLE 5

Wallboard Formulation 2
(For making a wallboard comprising a gypsum core between two sheets of paper)

| Core layer slurry | Useable Range | Preferred Range | Most Preferred Range | Specific Example |
|---|---|---|---|---|
| Calcined calcium sulfate (calcium sulfate hemihydrate and optionally calcium sulfate anhydrite, but at least 60 wt % calcium sulfate hemihydrate in the calcined calcium sulfate) (wt % on a dry basis) | 88 to 99.6 | 94.5 to 99.6 | 96.5 to 99.6 | 88 to 99.6 |
| Vesicle dedusting agent (wt % on a dry basis) | 0.01 to 10 | 0.1 to 5 | 0.1 to 3 | 0.3 to 0.8* |
| Dispersant (wt % on a dry basis) | 0.01 to 2 | 0.05 to 0.5 | 0.05 to 0.5 | 0.05 to 0.5 |
| Weight ratio of the water to calcium sulfate hemihydrate in slurry | 1:6 to 1:1 | 0.2:1 to 0.8:1 | 0.4:1 to 0.7:1 | 2:3 |

*ultra-sonicated lecithin vesicles

Producing Wallboards of Gypsum with Embedded Cellulose Fiber

Figure 5:
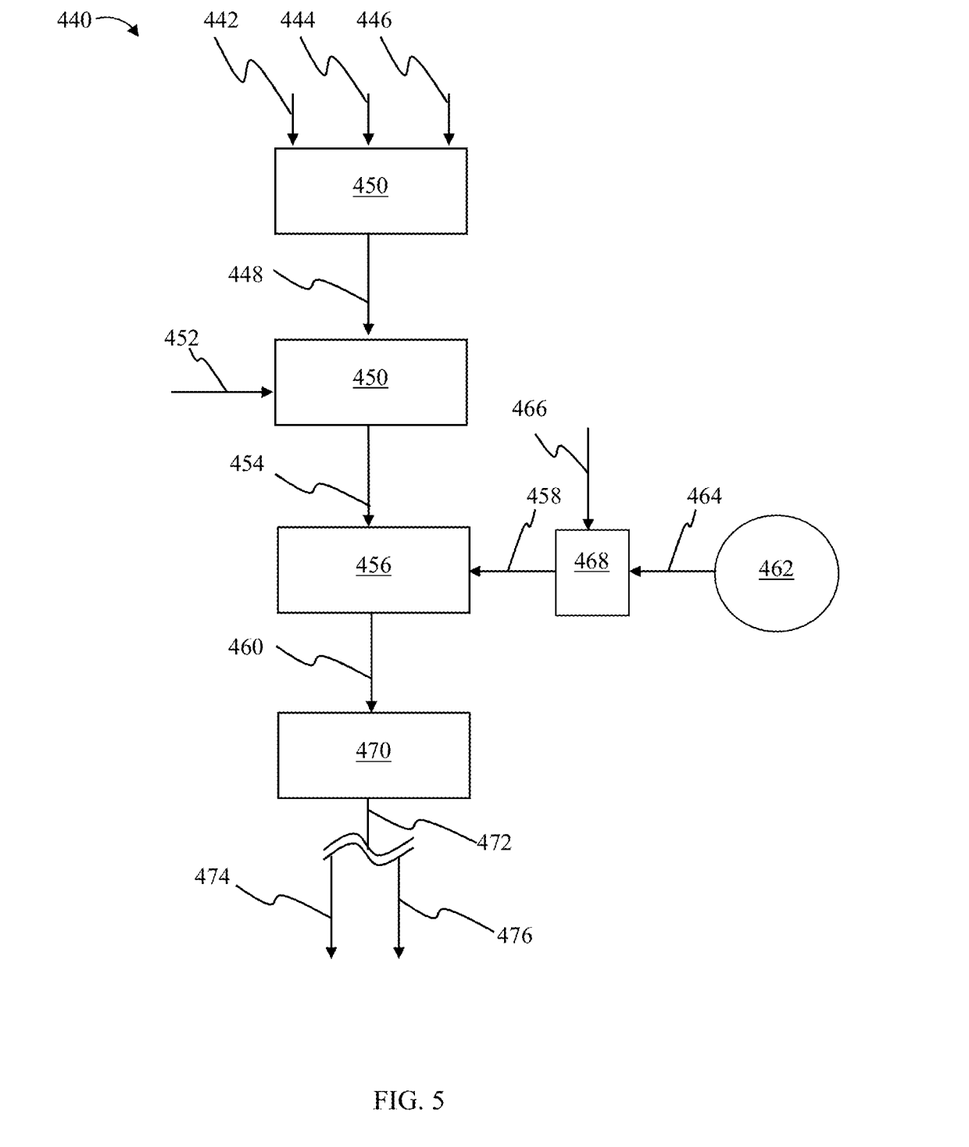
FIG. 5 illustrates a schematic diagram of an exemplary process for producing wallboards of gypsum with embedded cellulose fiber of the invention.

FIG. 5 illustrates a schematic diagram of an exemplary process 440 for producing wallboards of gypsum with embedded cellulose fiber of the invention. The described exemplary process 440 begins by mixing uncalcined gypsum 442 and host particles 444 (e.g. wood or paper fibers) with water 444 to form a dilute aqueous slurry 448 (also referred to herein as a feed slurry 448) in a mixer 450. The source of the gypsum 442 may be from raw ore or from the by-product of a flue-gas-desulphurization or phosphoric-acid process. The gypsum 442 should be of a relatively high purity (i.e., preferably at least about 92 wt % to 96 wt % calcium sulfate dihydrate) and finely ground (e.g., 92 wt % to 96 wt % of minus 100 mesh or smaller). Larger particles may lengthen the conversion time. The gypsum 442 can be introduced as an aqueous slurry.

The host particle 444 (also referred to herein as wood fibers 444) is preferably a cellulosic fiber which may come from waste paper, wood pulp, wood flakes, and/or another plant fiber source. Preferably the fiber is porous, hollow, split, and/or rough surfaced such that its physical geometry provides accessible interstices or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum 442; such as hemicelluloses, acetic acid, etc.

The ground gypsum 442 and wood fibers 444 are mixed with sufficient water 446 to make the feed slurry 448 having a solids content of about 5 wt % to about 30 wt % (i.e., water 446 at about 70 wt % to about 95 wt %), although the feed slurry 448 having a solids content at about 5 wt % to about 20 wt % is preferred. The solids in the feed slurry 448 should comprise from wood fibers 444 at about 0.5 wt % to about 30 wt % on a dry basis of the wallboard and preferably wood fibers 444 at about 3 wt % to about 20 wt %, the balance being mainly gypsum 442 (e.g., at least about 95 wt % of the balance being gypsum 442).

The feed slurry 448 is fed into a pressure vessel 450 (e.g., an autoclave) equipped with a continuous stirring or mixing device. Crystal modifiers, such as organic acids, can be added to the slurry at this point, if desired, to stimulate or retard crystallization or to lower the calcining temperature. Steam 452 is injected into the vessel 450 to bring the interior temperature of the vessel 450 up to between about 212° F. (100° C.) and about 350° F. (177° C.), and autogenous pressure; the lower temperature being approximately the practical minimum at which the calcium sulfate dihydrate will calcine to calcium sulfate hemihydrate within a reasonable time; and the higher temperature being about the maximum temperature for calcining to calcium sulfate hemihydrate without undue risk of causing some the calcium sulfate hemihydrate to convert to anhydrite. The vessel 450 temperature is preferably on the order of about 285° F. (140° C.) to 305° F. (152° C.).

When the feed slurry 448 is processed under these conditions for a sufficient period of time, for example on the order of 15 minutes, enough water will be driven out of the calcium sulfate dihydrate molecule to convert it to the calcium sulfate hemihydrate. The solution, aided by the continuous agitation to keep the particles in suspension, will wet out and penetrate the open voids in the host particles 444. As saturation of the solution is reached, the calcium sulfate hemihydrate will nucleate and begin forming crystals in, on and around the voids and along the walls of the fibers of the host particles 444.

It is believed that during the autoclaving operation, the dissolved calcium sulfate penetrates into the voids in the wood fibers 444 and subsequently precipitates as acicular calcium sulfate hemihydrate crystals within, on, and about the voids and surfaces of the wood-fibers.

After the conversion of the calcium sulfate dihydrate to the calcium sulfate hemihydrate (i.e., calcining of the gypsum) is complete, the pressure on the vessel 450 is reduced and the calcined slurry 454 is passed through a headbox 456 where an accelerator dispersion 458 is added to produce a product slurry 460. An accelerator dispersion 458 can be added to the calcined slurry 454 at the headbox 456 may be produced from a two-step process or a one-step process. For example, FIG. 5 illustrates a one-step process, the accelerator components are hot milled in a ball miller 462, mixed with water or other suitable liquid carrier 466 in a vessel 468 to produce the accelerator dispersion 458. The accelerator can be aged in the vessel 468 for a necessary amount of time until added to the headbox 456 including overnight, preferably about one minute to about 1 hour.

Alternatively, the accelerator (dispersed or in dry form) can be produced separately and added to headbox 456.

The headbox 456 distributes the product slurry 460 onto a dewatering conveyor 470 (e.g., a flat porous forming surface). While on the dewatering conveyor 470, as much as 90% of the water in the product slurry 460 is removed, leaving a filter cake 472 having approximately 35 wt. % water by weight. At this stage the filter cake 472 consists of wood fibers interlocked with rehydratable calcium sulfate hemihydrate crystals and can still be broken up into individual composite fibers or nodules, shaped, cast, or compacted to a higher density. At this point, the filter cake 472 can be either preserved as a hemihydrate composite 474 (i.e., a composite of calcium sulfate hemihydrate and wood fibers) for future product formation or formed directly into a product composed of dihydrate composite 476 (i.e., a composite of calcium sulfate dihydrate and wood fibers), each of which is described in U.S. Pat. No. 5,320,677, herein incorporated by reference.

For example, if it is desired to preserve the hemihydrate composite 474 in a rehydratable state for future use, it is necessary to dry it promptly, preferably at about 200° F. (93° C.), to remove the remaining free water before hydration starts to occur. Alternatively, the dewatered filter cake can be directly formed into a desired product shape and then rehydrated to the dihydrate composite 476. To accomplish this, the temperature of the filter cake 472 is brought down to below about 120° F. (49° C.). Although, the extraction of the bulk of the water 446 in the dewatering step will contribute significantly to lowering the filter cake 472 temperature, additional external cooling may be required to reach the desired level within a reasonable time. Because of the interlocking of the acicular hemihydrate crystals with the wood-fibers, and the removal of most of the carrier liquid from the filter cake 472, migration of the calcium sulfate is averted, leaving a homogeneous composite.

Then, the filter cake 472 can be rehydrated. The rehydration effects a recrystallization of the calcium sulfate hemihydrate to calcium sulfate dihydrate in place within and about the voids and on and about the wood fibers, thereby preserving the homogeneity of the composite. The crystal growth also connects the calcium sulfate crystals on adjacent fibers to form an overall crystalline mass, enhanced in strength by the reinforcement of the wood fibers.

Before the hydration is complete, it is desirable to promptly dry the composite mass to remove the remaining free water. Otherwise, the hygroscopic wood fibers tend to hold, or even absorb, uncombined water which will later evaporate. If the calcium sulfate coating is fully set before the extra water is driven off, the fibers may shrink and pull away from the gypsum when the uncombined water does evaporate. Therefore, for optimum results it is preferable to remove as much excess free water from the composite mass as possible before the temperature drops below the level at which hydration begins.

When finally set, the dihydrate composite 476 exhibits desired properties contributed by both of its two components. The wood fibers increase the strength, particularly flexural strength, of the gypsum matrix, while the gypsum acts as a coating and binder to protect the wood fiber, impart fire resistant and decrease expansion due to moisture.

The filter cake 472, the calcium sulfate hemihydrate composite 474, and the calcium sulfate dihydrate composite 476 may have a thickness of about ¼ in to about 1 in, and preferable about ¼ in to about ⅜ in. Typically, a line speed during gypsum-fiber composite board manufacturing for thicker boards (e.g., ½ in and greater) is limited by the speed of drying steps. However, for thinner boards, the hydration of the filter cake 472 limits the line speed.

Producing Wallboards of Gypsum Layer Between Paper Sheets

In a typical gypsum panel manufacturing process, gypsum board is produced by uniformly dispersing calcined gypsum (calcium sulfate hemihydrate, commonly referred to as "stucco") in water to form an aqueous calcined gypsum slurry. The aqueous calcined gypsum slurry is typically produced in a continuous manner by inserting stucco and water and other additives into a mixer which contains means for agitating the contents to form a uniform gypsum slurry.

In the present method the vesicle dedusting agent can be added to the slurry at a concentration of 0.1% to 10% by weight of the slurry for the gypsum core of the wallboard on a dry (water-free) basis.

If desired, the phospholipid molecules are added directly to the slurry, forming vesicles by self-assembly in the gypsum slurry.

The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit to reduce slurry density. The stream of slurry passes through the discharge conduit from which it is continuously deposited onto a moving web of cover sheet material (the first of the two paper sheets) supported by a forming table.

The slurry is allowed to spread over the moving web as it advances along the forming table. A second web of cover sheet material (the second of the two paper sheets) is applied to cover the slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions.

Prior devices and methods for addressing the production of gypsum wallboard are disclosed in commonly-assigned U.S. Pat. Nos. 5,683,635; 5,643,510; 6,494,609; 6,874,930; 7,007,914; and 7,296,919, incorporated by reference.

Clauses Describing Various Characteristics of Products of the Invention

Clause 1: A ceiling tile comprising a dried base mat that comprises:
(a) mineral wool;
(b) binder;
(c) a vesicle dedusting agent at about 0.01 wt % to about 10 wt %, wherein the vesicle dedusting agent comprises vesicles;
(d) optionally cellulosic fiber;
(e) optionally perlite;
(f) optionally glass fiber; and
(g) optionally calcium sulfate dihydrate.

Clause 2. The ceiling tile of Clause 1, wherein the dried base mat comprises:
(a) about 8 wt % to about 25 wt % mineral wool;
(b) about 9 wt % to about 15 wt % binder;
(c) a vesicle dedusting agent at about 0.01 wt % to about 10 wt %, wherein the vesicle dedusting agent comprises vesicles;
(d) about 9 wt % to about 15 wt % cellulosic fiber;
(e) about 40 wt % to about 65 wt % perlite;
(f) optionally glass fiber; and
(g) optionally calcium sulfate dihydrate.

Clause 3. The ceiling tile of Clause 2, wherein the dried base mat has an absence of glass fiber and/or an absence of gypsum.

Clause 4. The ceiling tile of Clause 1, wherein the dried base mat comprises:
(a) about 60 wt % to about 90 wt % mineral wool;
(b) about 4 wt % to about 10 wt % binder;
(c) a vesicle dedusting agent at about 0.01 wt % to about 10 wt %, wherein the vesicle dedusting agent comprises vesicles;
(d) optionally cellulosic fiber;
(e) 0 wt % to about 10 wt % perlite;
(f) 0 wt % to about 10 wt % glass fiber; and
(g) 0 wt % to about 5 wt % calcium sulfate dihydrate.

Clause 5. The ceiling tile of Clause 4, wherein the dried base mat has an absence of cellulosic fiber.

Clause 6. The ceiling tile of Clause 1, wherein the dried base mat comprises:
(a) about 30 wt % to about 70 wt % mineral wool;
(b) about 5 wt % to about 15 wt % binder;
(c) a vesicle dedusting agent at about 0.01 wt % to about 10 wt %, wherein the vesicle dedusting agent comprises vesicles;
(d) about 2 wt % to about 20 wt % cellulosic fiber;
(e) about 10 wt % to about 50 wt % perlite;
(f) optionally glass fiber; and
(g) optionally calcium sulfate dihydrate.

Clause 7. The ceiling tile of Clause 6, wherein the dried base mat has an absence of glass fiber and/or an absence of calcium sulfate dihydrate.

Clause 8. The ceiling tile of any one of Clauses 1-7, wherein the vesicles comprise unilamellar vesicles.

Clause 9. The ceiling tile of Clause 8, wherein the unilamellar vesicles have an average diameter of about 50 nm up to 5000 nm and a polydispersity index of about 0.2 to about 0.5.

Clause 10. The ceiling tile of Clause 8, wherein the unilamellar vesicles have an average diameter of about 50 nm up to 500 nm and a polydispersity index of about 0.2 to about 0.5.

Clause 11. The ceiling tile of any one of Clauses 1-10, wherein the vesicles comprise multilamellar vesicles.

Clause 12. The ceiling tile of Clause 11, wherein the multilamellar vesicles have an average diameter of about 100 nm up to 5 microns and a polydispersity index of about 0.2 to about 0.5.

Clause 13. The ceiling tile of any one of Clauses 1-8, wherein the vesicles comprise lecithin.

Clause 14. The ceiling tile of any one of Clause 1-8, wherein the vesicles comprise a polyethylene glycol phospholipid derivative and methoxypoly(ethylene glycol)-phosphatidylethanolamine (mPEG-PE).

Clause 15. The ceiling tile of Clause 14, wherein a weight percentage on a dry basis of the PEG in the polyethylene glycol phospholipid derivative and the mPEG-PE is cumulatively about 0.1 mol % to about 10 mol % based on a total vesicle composition.

Clause 16. The ceiling tile of any one of Clauses 1-8, wherein the vesicles comprise polyethylene oxide-block-poly($\varepsilon$-caprolactone) and/or polyethylene oxide-block-polylactide.

Clause 17. A wallboard produced from a slurry, the slurry comprising:
(a) calcium sulfate hemihydrate at 70 wt % to 95 wt %;
(b) a vesicle dedusting agent at about 0.01 wt % to about 10 wt %, wherein the vesicle dedusting agent comprises vesicles;
(c) optionally cellulose fibers at about 0.5 wt % to about 3 wt %;
(d) optionally at least one dispersant at about 0.01 wt % to about 2 wt %; and
(e) water at a ratio of water to dry components of about 1:6 to about 20:1.

Clause 18. The wallboard of Clauses 17, wherein the slurry comprises:
(a) the calcium sulfate hemihydrate at 70 wt % to 95 wt %;
(b) the vesicle dedusting agent at about 0.01 wt % to about 10 wt %, wherein the vesicle dedusting agent comprises vesicles;
(c) the cellulose fibers at about 0.5 wt % to about 3 wt %;
(d) optionally the at least one dispersant; and
(e) the water at a ratio of water to dry components of about 3:1 to about 20:1.

Clause 19. The wallboard of Clause 17, wherein the slurry comprises:

(a) the calcium sulfate hemihydrate at 88 wt % to 99.6 wt %;
(b) the vesicle dedusting agent at about 0.01 wt % to about 10 wt %, wherein the vesicle dedusting agent comprises vesicles;
(c) optionally the cellulose fibers;
(d) the at least one dispersant at about 0.01 wt % to about 2 wt %; and
(e) the water at a ratio of water to dry components of about 1:6 to about 1:1.

Clause 20. The wallboard of any one of Clauses 17-19, wherein the vesicles comprise unilamellar vesicles.

Clause 21. The wallboard of Clause 20, wherein the unilamellar vesicles have an average diameter of about 50 nm up to 5000 nm and a polydispersity index of about 0.2 to about 0.5.

Clause 21. The wallboard of Clause 20, wherein the unilamellar vesicles have an average diameter of about 50 nm up to 500 nm and a polydispersity index of about 0.2 to about 0.5.

Clause 22. The wallboard of any one of Clauses 17-22, wherein the vesicles comprise multilamellar vesicles.

Clause 23. The wallboard of Clause 21, wherein the multilamellar vesicles have an average diameter of about 100 nm up to 5 microns and a polydispersity index of about 0.2 to about 0.5.

Clause 24. The wallboard of any one of Clauses 17-23, wherein the vesicles comprise lecithin.

Clause 25. The wallboard of any one of Clauses 17-24, wherein the vesicles comprise a polyethylene glycol phospholipid derivative and methoxypoly(ethylene glycol)-phosphatidylethanolamine (mPEG-PE).

Clause 26. The wallboard of any one of Clauses 17-25, wherein a weight percentage on a dry basis of the PEG in the polyethylene glycol phospholipid derivative and the mPEG-PE is cumulatively about 0.1 mol % to about 10 mol % based on a total vesicle composition.

Clause 27. The wallboard of any one of Clauses 17-25, wherein the vesicles comprise polyethylene oxide-block-poly(ε-caprolactone) and/or polyethylene oxide-block-polylactide.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1

A vesicle dedusting agent comprising lecithin vesicles was prepared by a film rehydration and ultrasonication method. Briefly, lecithin powder was dissolved in chloroform (other suitable organic solvents could have been used). The chloroform was evaporated away using Argon gas to form a lipid film. The lipid film was rehydrated with water, and the mixture was ultrasonicated in a sonicator bath for one hour or more to form a turbid, milky dispersion, consistent with mixtures containing unilamellar vesicles.

Alternatively, high shear mixing can also be used. In short, lecithin powder was added to water and the mixture was homogenized at high shear (e.g., about 10,000 rpm or greater in a Cowles-type mixer) for 30 minutes or more. The vesicle dispersion could be subsequently sonicated after mixing to result in smaller diameter unilamellar vesicles.

Example 2

Construction compositions were produced according to Table 4 where the dedusting agent in Formula 1 was lecithin without additional processing (i.e., free lecithin) and the dedusting agent in Formula 2 was lecithin vesicles. The Control had no lecithin. Except for the ratio of water to dry components, all amounts of components of Table 4 are on a dry (water free) weight percent basis.

TABLE 4

Example formulations

| Component | Control | Formula 1 | Formula 2 |
|---|---|---|---|
| Calcium carbonate (wt % on a dry basis) | 92.8 | 89.8 | 89.8 |
| Lecithin (wt % on a dry basis) | 0 | 0.5* | 0.5** |
| Water swelling clays (wt % on a dry basis) | 3.5 | 3.5 | 3.5 |
| Latex emulsion binder (wt % on a dry basis) | 2.3 | 4.6 | 4.6 |
| PVA binder (wt % on a dry basis) | 0 | 0.2 | 0.2 |
| Cellulosic thickeners (wt % on a dry basis) | 1.1 | 1.1 | 1.1 |
| Other additives*** (wt % on a dry basis) | 0.3 | 0.3 | 0.3 |
| Water (weight ratio of water to dry components) | 0.75:1 | 0.75:1 | 0.75:1 |

*free lecithin
**vesical lecithin prepared per Example 1
***including biocide

A modified version of the ASTM C474-15 tape bond test method at 75° F. and 50% relative humidity was carried out to measure the % tape fiber remaining, an indication of composition strength and a key performance property of the construction composition. A construction composition containing 0.5% 'free' lecithin was modified with additional binders ("Formula 1"). Another lightweight construction composition formula containing 0.5 wt % lecithin vesicles was modified with the same additional binders ("Formula 2) as Formula 1. A third, unmodified lightweight construction composition without additional binders or lecithin ("Control") was used for comparison. Table 5 provides the paper tape bond test results over three trials for the different formulations.

TABLE 5

Example formulations

| | Control | Formula 1* | Formula 2** |
|---|---|---|---|
| Trial 1 | 95 | 20 | 65 |
| Trial 2 | 95 | 10 | 65 |
| Trial 3 | 95 | 35 | 80 |
| Average | 95 | 22 | 70 |

*lecithin dedusting agent
**lecithin vesicle dedusting agent

The results in Table 5 indicate the construction composition containing 'free' lecithin (Formula 1) has considerably less strength than construction composition containing lecithin vesicles (Formula 2). In other words, lecithin vesicles do not diminish strength as significantly as 'free' lecithin compared to control.

Figure 6:
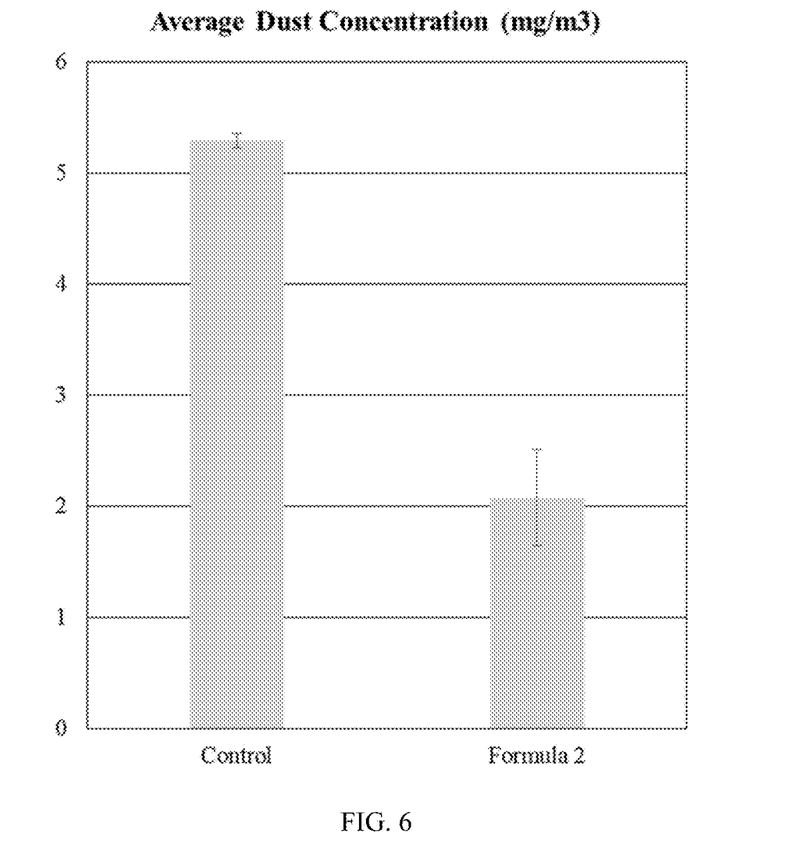
FIG. 6 is a plot of the average dust concentration (mg/m$^3$) produced from the example Control and Formula 2.

Additionally, the Control and Formula 2 were tested for the amount of dust produced when sanded for 40 seconds in an enclosed room with consistent force. The average dust was measured using a dust tracking device for 15 minutes. FIG. 6 is a plot of the average dust concentration (mg/m$^3$) produced from each sample.

While particular versions of the invention have been shown and described, it will be appreciated by those skilled in the art that changes and modifications may be made thereto without departing from the invention in its broader aspects and as set forth in the following claims.

What is claimed is:

1. A wallboard having a layer produced from a slurry, the slurry comprising:
   calcium sulfate hemihydrate at 70 wt % to 95 wt %;
   a vesicle dedusting agent at about 0.01 wt % to about 10 wt %, wherein the vesicle dedusting agent comprises vesicles;
   optionally at least one dispersant at about 0.01 wt % to about 2 wt %; and
   water at a ratio of water to dry components of about 1:6 to about 20:1.

2. The wallboard of claim 1, wherein the slurry comprises:
   the calcium sulfate hemihydrate at 70 wt % to 95 wt %;
   the vesicle dedusting agent at about 0.01 wt % to about 10 wt %, wherein the vesicle dedusting agent comprises vesicles;
   cellulose fibers at about 0.5 wt % to about 3 wt %;
   optionally the at least one dispersant at about 0.01 wt % to about 2 wt %; and
   the water at a ratio of water to dry components of about 3:1 to about 20:1.

3. The wallboard of claim 1, wherein the slurry further comprises: cellulose fibers at about 0.5 wt % to about 3 wt %.

4. The wallboard of claim 1, wherein the vesicles comprise unilamellar vesicles.

5. The wallboard of claim 4, wherein the unilamellar vesicles have an average diameter of about 50 nm up to 5000 nm and a polydispersity index of about 0.2 to about 0.5.

6. The wallboard of claim 1, wherein the vesicles comprise multilamellar vesicles.

7. The wallboard of claim 6, wherein the multilamellar vesicles have an average diameter of about 100 nm up to 5 microns and a polydispersity index of about 0.2 to about 0.5.

8. The wallboard of claim 1, wherein the vesicles comprise lecithin.

9. The wallboard of claim 1, wherein the vesicles comprise a polyethylene glycol phospholipid derivative and methoxypoly(ethylene glycol)-phosphatidylethanolamine (mPEG-PE).

10. The wallboard of claim 9, wherein a weight percentage on a dry basis of the PEG in the polyethylene glycol phospholipid derivative and the mPEG-PE is cumulatively about 0.1 mol % to about 10 mol % based on a total vesicle composition.

11. The wallboard of claim 1, wherein the vesicles comprise polyethylene oxide-block-poly(ε-caprolactone) and/or polyethylene oxide-block-polylactide.

12. A wallboard having a layer produced from a slurry, the slurry comprising:
    calcium sulfate hemihydrate at 88 wt % to 99.6 wt %;
    vesicle dedusting agent at about 0.01 wt % to about 10 wt %, wherein the vesicle dedusting agent comprises vesicles;
    at least one dispersant at about 0.01 wt % to about 2 wt %; and
    water at a ratio of water to dry components of about 1:6 to about 1:1.

13. The wallboard of claim 12, wherein the vesicles comprise lecithin.

14. The wallboard of claim 12, wherein the vesicles comprise a polyethylene glycol phospholipid derivative and methoxypoly(ethylene glycol)-phosphatidylethanolamine (mPEG-PE).

* * * * *